Aug. 10, 1954
G. ROSSI
2,685,940
SEPARATOR
Filed March 27, 1951
3 Sheets-Sheet 1
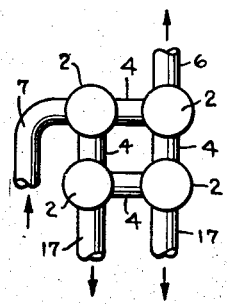
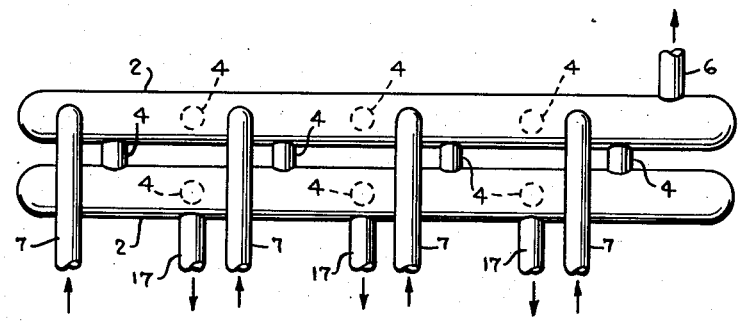
Fig 1.  Fig 1a.
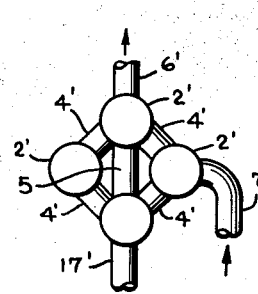
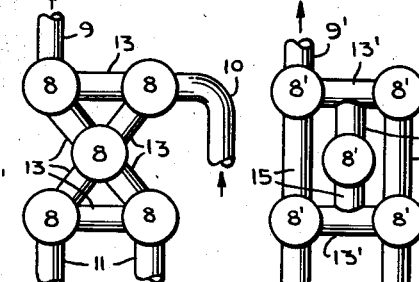
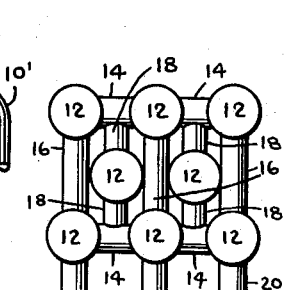
Fig 2.  Fig 3.  Fig 4.  Fig 5.
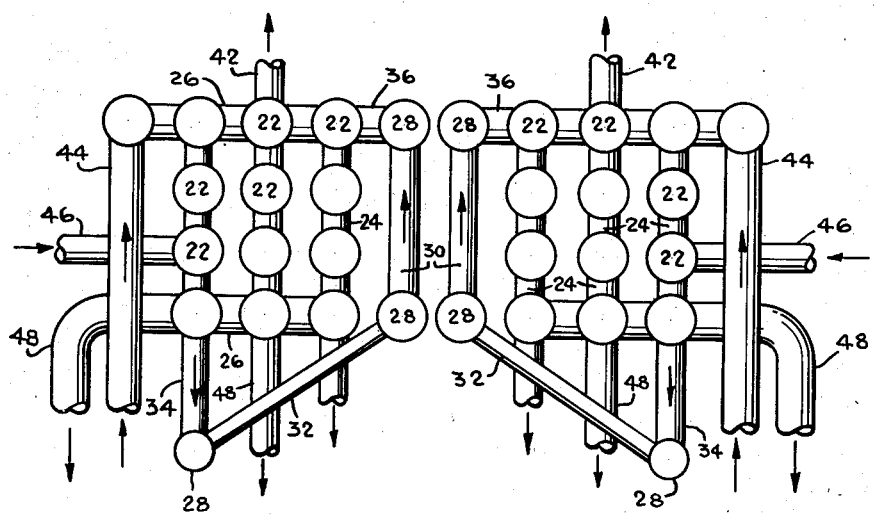
Fig 6.
INVENTOR:
GIOVANNI ROSSI,
BY
HIS AGENT.

INVENTOR:
GIOVANNI ROSSI,

Aug. 10, 1954 G. ROSSI 2,685,940
SEPARATOR

Filed March 27, 1951 3 Sheets-Sheet 3

INVENTOR:
GIOVANNI ROSSI,
BY

HIS AGENT.

Patented Aug. 10, 1954

2,685,940

UNITED STATES PATENT OFFICE 2,685,940

SEPARATOR

Giovanni Rossi, Valle Lomellina, Italy

Application March 27, 1951, Serial No. 217,735

Claims priority, application Italy March 30, 1950

13 Claims. (Cl. 183—100)

1

The invention relates to a separator of the type for separating from a mixture of compressible and incompressible fluids the liquid and gaseous substances; and relates more particularly to separators of the type for use as collectors for steam generator boilers.

The invention accordingly has among its objects the provision of such a separator that operates at a high degree of efficiency, is simple to manufacture and easy to maintain.

Further objects and advantages of the invention will be set forth in part in the following specification and in part will be obvious therefrom without being specifically referred to, the same being realized and attained as pointed out in the claims hereof.

The invention essentially comprises a plurality of tubular chamber structures that are interconnected for intercommunication. The interconnection is formed by smaller tubes that may be placed angularly as well as off-set from each other, so as to create changes of direction for the fluids to facilitate the separation of the liquid and volatile component parts thereof.

The foregoing and other objects of the invention will be best understood from the following description of exemplifications thereof, reference being had to the accompanying drawings, wherein:

Fig. 1 is a fragmentary elevational view showing a separator with four tubular chamber structures, in accordance with an embodiment of the invention;

Fig. 1a is a fragmentary side elevational view of the separator illustrated in Fig. 1;

Fig. 2 is a fragmentary elevational view, similar to Fig. 1, but showing a modified arrangement;

Fig. 3 is a fragmentary elevational view, showing five tubular chambers;

Fig. 4 is a fragmentary elevational view similar to Fig. 3 but embodying a further modification;

Fig. 5 is a fragmentary elevational view showing a separator having eight tubular chambers;

Fig. 6 is an elevational view of a separator having symmetrically arranged a series of tubular chambers disposed in superposed layers, in accordance with a further modification of the invention;

2

Figure 8:
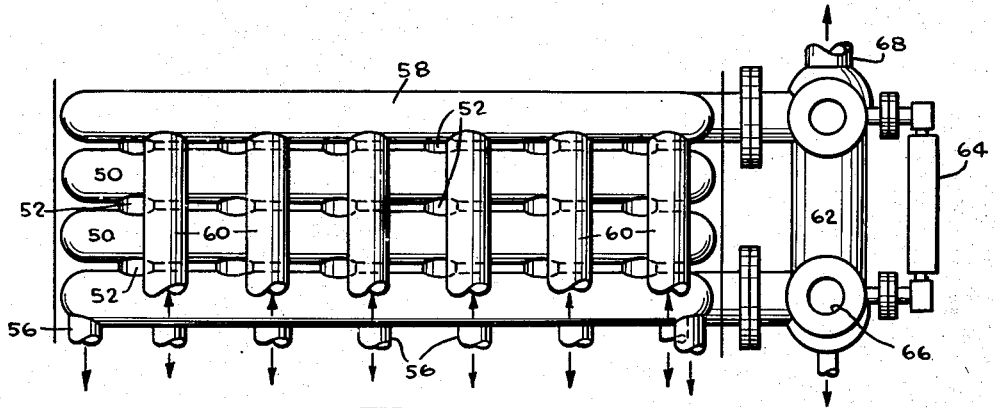
Fig. 8 is a front elevational view of a modified separator.
Figure 9:
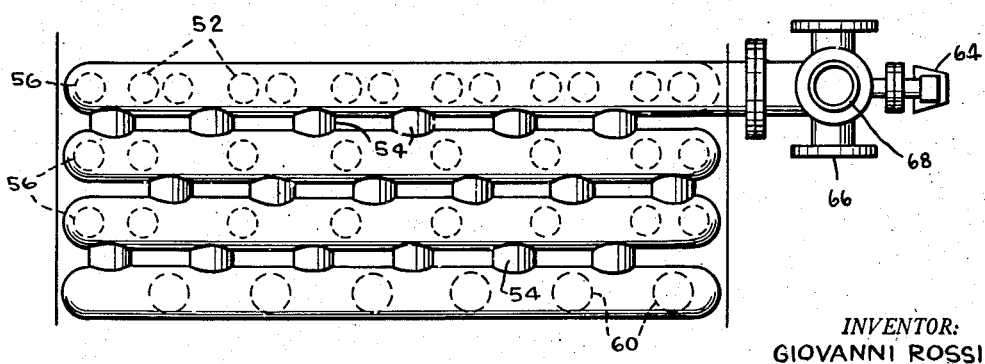
Figure 10:
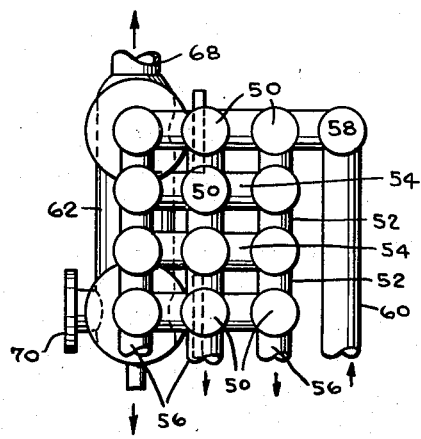

Fig. 9 is a plan view of the embodiment shown in Fig. 8;

Fig. 10 is a side elevational view of the embodiment shown in Fig. 8; and

Figure 11:
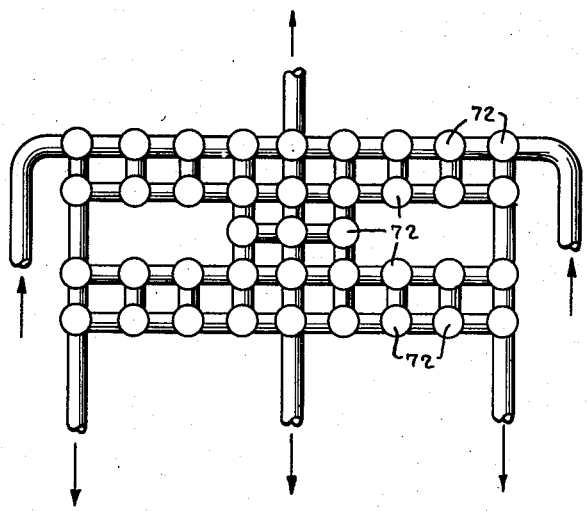

Fig. 11 is an elevational view of a further modified separator.

In carrying the invention into effect in the embodiments which have been selected for illustration in the accompanying drawings and for description in this specification, and referring now particularly to Figs. 1 and 1a, there is shown a separator, for instance of the steam collector type; the separator is provided with four tubular chamber structures, such as tubular elements or tubes 2, that are disposed at the corners of a square or quadrangle. Said tubular elements 2 are interconnected by connecting pipes 4, some being horizontal and others vertical. Said connecting pipes 4 have a smaller diameter than the tubular elements 2 and may be off-set relative to each other to permit a space saving construction and also to facilitate stirring of the mixture of gases or vapors and liquids flowing therein for separation of the liquid from the gaseous substances thereof. Said pipes 4 provide for interior intercommunication between all of the four tubular elements 2. The separator may be mounted adjacent, and even atop, a boiler (not shown), for receiving from the boiler a water-steam mixture, in order to separate the water from the steam and to return the condensate water component thereof into the boiler circulation. For this purpose, the separator of Fig. 1 is provided with one or more conduits 7 that are interconnected to the boiler to receive the output mixture therefrom; said conduits 7 are connected to one of the top tubular elements 2 for delivering the mixture thereto. Return pipes 17 are arranged, one interconnected to each of the lower tubular elements 2, for returning the condensate to the boiler. One or more discharge pipes 6 are mounted on the other of the upper tubular elements 2 for delivering the gaseous substance, such as steam, following separation thereof in the separator from the mixture.

Water-steam mixture may be delivered to the separator from a boiler by means of the conduits 7 to one of the upper tubular elements 2. From there the mixture, owing to continued delivery from the boiler, is conducted through the connecting pipes 4 to all of the tubular elements 2, and in its path is subjected at high circulation velocity frequently to change directions for thorough stirring. Thereby, the condensate is separated from the live steam, and the condensate is returned to the boiler in the return pipes 17 from the lower tubular elements 2, and live steam is drawn off the separator through the discharge pipes 6 from the other of the upper tubular elements 2.

The arrangement of four tubular chambers 2, instead of having a single large dimensioned chamber, has the advantage of simplicity of construction, since smaller wall thicknesses may be used as compared with those needed for a single large chamber; furthermore, the separator may be shaped to follow the contour of the boiler, thereby making possible mounting of the separator directly on the boiler, thus minimizing any losses of heat energy due to long conduits. In this way the overall dimensions are reduced allowing a high velocity of circulation in connection with the boiler, thereby increasing the steam output.

The arrangement shown in Fig. 2 is similar to that of the preceding illustration, but the system of the tubular elements 2', is turned for about 45° as compared to Fig. 1 and, in addition to connecting pipes 4', there are also provided one or more diagonal pipes 5 that interconnect the single bottom tubular element 2' with the single top tubular element 2'. The discharge pipes 6' are mounted on the top tubular element, and the return pipes 17' for condensate are connected to the bottom tubular element 2'. The conduits 7' are arranged to deliver water-steam mixtures from the boiler to one of the intermediate tubular elements 2'. The pipes 4' may again be disposed off-set, and in all other respects the construction and operation of the embodiment of Fig. 2 is similar to that shown in Fig. 1.

In Fig. 3 there is shown a separator-collector having five tubular elements or tubes 8, that correspond to elements 2, 2' of the preceding embodiments. Four of the tubes 8 are arranged along the corners of a quadrangle, and the fifth tube is in the center of said quadrangle. There are horizontal and diagonal connecting pipes 13 between the tubes 8; condensate return pipes 11 are arranged on the lower tubes 8, mixture conduits 10 are mounted on one of the upper tubes 8 for connection to the boiler, and steam discharge pipes 9 are connected to the other of the upper tubes 8.

In the modification of Fig. 4, there are again provided five tubes designated 8', but the outer four tubes 8' are interconnected by upper and lower horizontal connecting pipes 13' and right and left vertical connecting pipes 15, similar to the arrangement shown in Fig. 1. The center tube is interconnected, by means of upper and lower vertical pipes 15 to the horizontal connecting pipes 13'.

In the foregoing embodiments, the steam-water mixture is delivered from the boiler to a point of the separator-collector that is at, or near, the highest point thereof, and spaced from the steam discharge point thereof, and above the condensate return point of same.

In Fig. 5, there are provided eight tubes, arranged in a manner similar to that of Fig. 4. The tubes are designated 12, and six of these are arranged in a pattern of a quadrangle and are interconnected by horizontal connecting pipes 14 and vertical connecting pipes 18. The remaining tubes 12 are staggered centrally of the outer tubes and are interconnected to the horizontal connecting pipes 14 by means of vertical pipes 18. Return pipes 20 for the condensate are provided for the lower three tubes 12, and create localized circulation. The surface of the evaporating layer in the collector is not greatly influenced by the level within the collector, as long as the connecting pipes are of a cross-section so dimensioned that they are not affected in their operation by variations of the level.

In Fig. 6 there is shown a separator-collector composed of two symmetrical sections, a right-hand and a lefthand section. Each of the sections comprises a plurality of parallel horizontal collector tubes 22 arranged in a series of vertical groups. The tubes of each vertical group are connected by vertical connecting pipes 24, and the upper as well as the lower tubes of all the groups are connected by horizontal connecting pipes 26. Each section is provided with an auxiliary conduit formed by three horizontal tubes 28 that are spaced from each other. Two of these tubes 28, namely an upper and a lower tube 28, are interconnected by vertical pipes 30, and the third tube 28 is interconnected to the lower tube 28 by a series of inclined parallel pipes 32, and is also interconnected to the lower tubes 22 of the section by vertical pipes 34. The uppermost tube 28 is connected to the upper tubes 22 of the section by means of horizontal pipes 36.

One or more mixture delivery conduits 44 are provided for each section for conducting water-steam mixture from the boiler, and these conduits 44 are connected to the uppermost tubes 22 of the section; condensate return pipes 48 are connected to the lowermost tubes 22 of the section and are operable to generate localized circulation; steam discharge pipes 42 are connected to the central of the uppermost tubes 22; and conduits 46 are provided for delivering to the collector feed water.

The series of inclined pipes 32 for each section may be so arranged that these pipes are close enough to each other to make outside surface contact, whereby there may be created a protective wall made of pipes for shielding the remainder of the collector; this series of pipes 32 may thus be arranged to form the ceiling of the combustion chamber of the steam generator, functioning as one of the evaporating elements.

Figure 7:
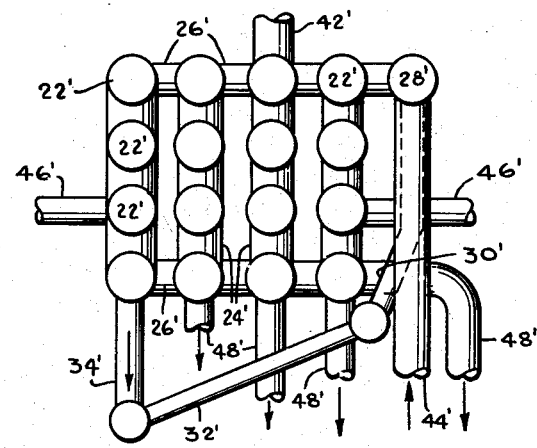
Fig. 7 is an elevational view showing one-half of the symmetrical arrangement of a separator similar to that shown in Fig. 6, but embodying a further modification.

A similar separator arrangement is shown in Fig. 7, but only the lefthand of the two symmetrical sections is shown in that view, and embodies a modification as compared to Fig. 6. Corresponding parts have been designated with reference numerals of the parts of Fig. 6 but provided with an exponential index. In this modification, the condensate return pipes 48' are disposed centrally of the collector instead of on the outside thereof, and similarly the mixture delivery conduits 44' are also arranged centrally. Two feed water conduits 46' are provided for each section. The modification of Fig. 7 comprises in each section sixteen tubes 22' as compared to the thirteen tubes 22 of a section of Fig. 6; furthermore, the inclined pipes 32' are disposed at a more obtuse angle with respect to the vertical, as compared to the corresponding parts of Fig. 6.

A further modified separator-collector is shown in Figs. 8, 9 and 10. It comprises twelve collector tubes 50 arranged horizontally and formed along the sides and centrally of a quadrangle. The tubes 50 are distributed in a manner wherein four horizontal layers are superposed vertically, each layer having three horizontally spaced tubes. The tubes of each layer are interconnected by means of horizontal connecting pipes 54, and vertical connection between the superposed tubes is provided by means of vertical connecting pipes 52; the horizontal connecting pipes 54, as best shown in Figs. 8 and 9, are offset between the vertical connecting pipes 52. The tubes 50 of the lowermost layer carry condensate return pipes 56. A separate tube 58 is provided in registry with the uppermost layer of the tubes 50 and is interconnected thereto by means of horizontal connecting pipes, and carries the water-steam mixture delivery conduits 60, the tube 58 acting as a separator.

The collector in accordance with this modification is provided with an auxiliary collector 62 that is interconnected to the top and bottom layer of the tubes 50. It is arranged to carry control instruments (not shown), and is provided with a level indicator 64 and flanges 66 and 70 for connection for instance to the feed water, and carries the steam discharge pipe 68.

A further modification is illustrated in Fig. 11, wherein the collector tubes 72 are so distributed as to create a central region in which the useful capacity is considerably smaller than throughout the remainder of the collector. Accordingly, the evaporating surface of the lower and upper regions of the collector is considerably larger than that of the central region. Thereby there are created two zones of greater capacity, namely in the upper and lower regions, and a third zone of restricted capacity in the central region. By this arrangement, variations of level in the central region are rendered highly sensitive, and this permits a prompt and efficient regulation of the generator in accordance with the said variations of level. If desired, the situation may instead be reversed and the level in the central region be stabilized by so arranging the tubes that the maximum capacity is available in the central region and, conversely, a reduced capacity in the upper and lower regions of the collector.

Certain of the advantages of the invention have already been herein referred to. It may be useful, however, to allude particularly at this point to usefulness of collectors in accordance with the instant invention in connection with high pressure boilers.

It will be observed that the tubes and pipes provide for intercommunication, so that fluids may circulate among all these elements, and that these elements intersect throughout at angles that differ from 180°. The connecting pipes may preferably be off-set from each other to provide for a maximum change in direction for the fluid circulating in the separator.

In the preceding description all of the collector tubes were shown with horizontal axes, but it will be understood by those skilled in this and related arts that the collector tubes may instead be arranged vertically or inclined; likewise, although all the collector tubes were shown parallel throughout the preceding description, they may instead be arranged angularly relative to each other.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a separator collector, for use in separating compressible from incompressible fluids of a mixture thereof, such as steam and water from a steam generator, in combination, a container comprising a series of horizontal tubular elements straight throughout their lengths and offset from each other and forming in said container upper and lower zones for the compressible and incompressible fluids, respectively, each element being interconnected to at least two other elements for intercommunication therewith, a plurality of connecting tubes straight throughout their lengths and disposed between said elements at right angles thereto connecting each element with at least two others, at least some of said tubes being arranged parallel to each other, and at least some being offset from each other, and at least some forming an angle with other tubes different from 180° for forcing the fluids flowing therein to change direction to improve the fluid separation.

2. In a separator collector, for use in separating compressible from incompressible fluids of a mixture thereof, such as steam and water from a steam generator, in combination, a container comprising a series of horizontal tubular elements straight throughout their lengths and offset from each other and forming in said container upper and lower zones for the compressible and incompressible fluids, respectively, each element being interconnected to at least two other elements for intercommunication therewith, a plurality of connecting tubes straight throughout their lengths and disposed between said elements at right angles thereto connecting each element with at least two others, at least some of said tubes being arranged parallel to each other, and at least some forming an angle with other tubes different from 180° for forcing the fluids flowing therein to change direction to improve the fluid separation.

3. In a separator collector as claimed in claim 2, said tubular elements being so disposed to provide a reduced capacity in at least one of said zones so as to create a sensibilization of the level in the other of said zones.

4. In a separator collector as claimed in claim 2, the number of said elements being four arranged at the corners of a quadrangle.

5. In a separator collector as claimed in claim 2, four of said elements being disposed at the corners of a quadrangle having two horizontal sides.

6. In a separator collector as claimed in claim 2, four of said elements being located at the corners of a quadrangle whereof one diagonal is disposed horizontally.

7. In a separator collector as claimed in claim 2, four of said elements being disposed at the corners of a quadrangle, and certain ones of said connecting tubes being disposed along the sides of said quadrangle.

8. In a separator collector as claimed in claim 2, four of said elements being disposed at the corners of a quadrangle, certain of said connecting tubes being disposed along the sides of said quadrangle and others along the diagonals thereof.

9. In a separator collector as claimed in claim 2, the number of said elements being five, four of which being disposed at the corners of a quadrangle, and the fifth centrally thereof.

10. In a separator collector as claimed in claim 2, at least some of said tubes being horizontal.

11. In a separator collector as claimed in claim 2, at least some of said tubes being vertical.

12. In a separator collector as claimed in claim 2, at least some of said tubes being inclined at an angle to the horizontal.

13. In a separator collector, for use in separating compressible from incompressible fluids of a mixture thereof, such as steam or water off a steam generator, in combination, a series of horizontal parallel tubular elements straight throughout their lengths and spaced from each other in accordance with a geometrical pattern, a plurality of connecting tubes straight throughout their lengths and operable for interconnecting each element with at least two other elements, the juncture between said elements and tubes being throughout at right angle, said tubes having a smaller diameter than said elements, said elements and tubes forming a container having a lower zone for the incompressible and an upper zone for the compressible fluids, means connected at said lower zone to discharge incompressible fluids collecting therein, means connected at said upper zone for discharging compressible fluids therefrom, and means for delivering the mixture to said container.

References Cited in the file of this patent

FOREIGN PATENTS

| Number | Country | Date |
|--------|---------|------|
| 13,279 | Great Britain | June 13, 1903 |
| 16,196 | Austria | May 10, 1904 |
| 352,123 | Germany | Apr. 21, 1922 |
| 519,255 | Great Britain | July 4, 1939 |